US 6,373,928 B1

United States Patent
Jones et al.

(10) Patent No.: US 6,373,928 B1
(45) Date of Patent: Apr. 16, 2002

(54) TELECOMMUNICATION CONTROL SWITCHING DEVICE

(75) Inventors: Graham Macpherson Jones; Grant Arthur John Elliott; Alfred Nassenstein, all of Auckland (NZ)

(73) Assignee: Teal Corporation Limited (NZ)

( * ) Notice: Subject to any disclaimer, the term of this patent is extended or adjusted under 35 U.S.C. 154(b) by 0 days.

(21) Appl. No.: 09/254,506
(22) PCT Filed: Sep. 5, 1997
(86) PCT No.: PCT/NZ97/00109
§ 371 Date: May 10, 1999
§ 102(e) Date: May 10, 1999
(87) PCT Pub. No.: WO98/10578
PCT Pub. Date: Mar. 12, 1998

(30) Foreign Application Priority Data

Sep. 5, 1996 (NZ) .................................... 299301

(51) Int. Cl.⁷ .............................................. H04M 11/00
(52) U.S. Cl. ............................. 379/102.04; 379/373.01
(58) Field of Search ................... 379/102.01–102.04, 379/373.01, 377, 382

(56) References Cited

U.S. PATENT DOCUMENTS 5,528,673 A   6/1996 Rosenthal
5,894,508 A * 4/1999 Kim ...................... 379/102.04

* cited by examiner

*Primary Examiner*—Wing F. Chan
(74) *Attorney, Agent, or Firm*—David E. Rogers; Squire, Sanders & Dempsey L.L.P.; Stuart A. Whittington

(57) ABSTRACT

This invention relates to a telecommunication control switching device (1) and method for controlling the power supply to an electrical device (8) through a telecommunication network (3). A device (1) of the present invention is connected between the telecommunication line (3) and a piece of telecommunication equipment, such as a telephone, as well as being connected between a mains supply (6) and an electrical appliance (8). The device (1) provides a switched mains outlet, and monitor given conditions in the telecommunications lines (3)/telecommunication equipment. The device (1), therefore, enables the electrical appliance (8) to automatically be switched on or off when those given conditions such as a ringing signal or off-hook situation in a telephone set, occur.

17 Claims, 3 Drawing Sheets

TELECOMMUNICATION CONTROL SWITCHING DEVICE

TECHNICAL FIELD

This invention relates to a method and apparatus for controlling the power supply to an electrical device via a telecommunication line.

BACKGROUND

Telephones are often positioned, whether at home or in an office environment, close to or at least in the same room as other electrical equipment capable of producing a sufficient noise to make it difficult or impossible for a user of the telephone to communicate effectively. An obvious example is where a telephone is in the same environment as a stereo, radio or the like. When answering an incoming call or making an outgoing call a user of a telephone must either turn the stereo down or off.

Any number of other electrical appliances or machinery may also be an annoyance to a person trying to communicate on a telephone.

Furthermore, the opposite situation may arise where a telephone user needs an electrical device to be turned on when using the telephone. For example, turning a light on in the middle of the night or turning on a computer or other device.

Thus, it is an object of the present invention to provide a telecommunication control switching device which overcomes at least some of the above-mentioned problems, or which at least provides the public with a useful alternative.

Other objects of the invention will become apparent from the following description which is given by way of example only.

DISCLOSURE OF INVENTION

According to one aspect of the present invention there is provided a telecommunication control switching device comprising:

telecommunication receiving means, power input means, power output means connectable to an electrical appliance, power switching means connected between the power input and output means, and control means including current sensing means adapted to inductively sense the presence of a signal present in the telecommunication means, the control means adapted to control the power switching means by monitoring the telecommunication receiving means and switching the power switching means to a second state when the control means detects given conditions at the telecommunication receiving means, and reverting said power switching means to a first state when said conditions are no longer present, and wherein the control means monitors the telecommunication receiving means by the current sensing means, the current sensing means adapted to produce a voltage differential at the input to a comparator when a current is sensed, the comparator providing a triggering signal which controls the power switching means.

In one preferred embodiment of a telecommunication control switching device of the present invention the given conditions to be detected by the control means may be the ringing and/or in use condition of telecommunication equipment operating on the telecommunication receiving means. Preferably, the telecommunication equipment may be a telephone.

In a preferred form of the present invention the power switching means may comprise a relay.

In one preferred form, the control means may comprise two units, each unit comprising a voltage comparing means and a delay means connected to the output of the voltage comparing means.

In one preferred form the control means may comprise two units, each unit comprising a comparator and a mono stable vibrator connected to the output of the comparator.

In a further preferred form of telecommunication control switching device of the present invention the power input means may be adapted to connect to a conventional mains power point.

In a further preferred form the telecommunication receiving means may comprise a telecommunication input means for a telecommunication line.

In a further preferred form the telecommunication control switching device of the present invention may further comprise an indicator means adapted to indicate when the power input means and power output means are disconnected from one another. Preferably, said indicator means may comprise a light emitting diode.

In another preferred form a telecommunication control switching device of the present invention may further comprise reverse operation means adapted to control whether the power switching means turns the power on or off under the given conditions.

In a preferred form, a device of the present invention may further comprise an integrated internal power supply.

According to a further aspect of the present invention there is provided a method of controlling the power supply to an electrical device through a telecommunication network, said method comprising:

monitoring a telecommunication receiving means, by inductively sensing current in the telecommunication receiving means detecting predetermined conditions of current in the telecommunication receiving means, operating a power switching means to connect or disconnect a power input means from a power output means, to which may be connected the electrical device, when those predetermined conditions are met and reversing said power switching means to disconnect or connect said power input and output means when said conditions are no longer present, wherein a voltage differential is produced responsive to the current sensing step, the voltage differential being processed to provide a triggering signal which controls the power switching means.

In a preferred form of the method of the present invention the predetermined conditions may comprise ringing and/or use of telecommunication equipment operating on the telecommunication receiving means, preferably a telephone.

Other aspects of the present invention may become apparent from the following description which is given by way of example only and with reference to the accompanying drawings.

DETAILED DESCRIPTION OF THE INVENTION

Figure 1:
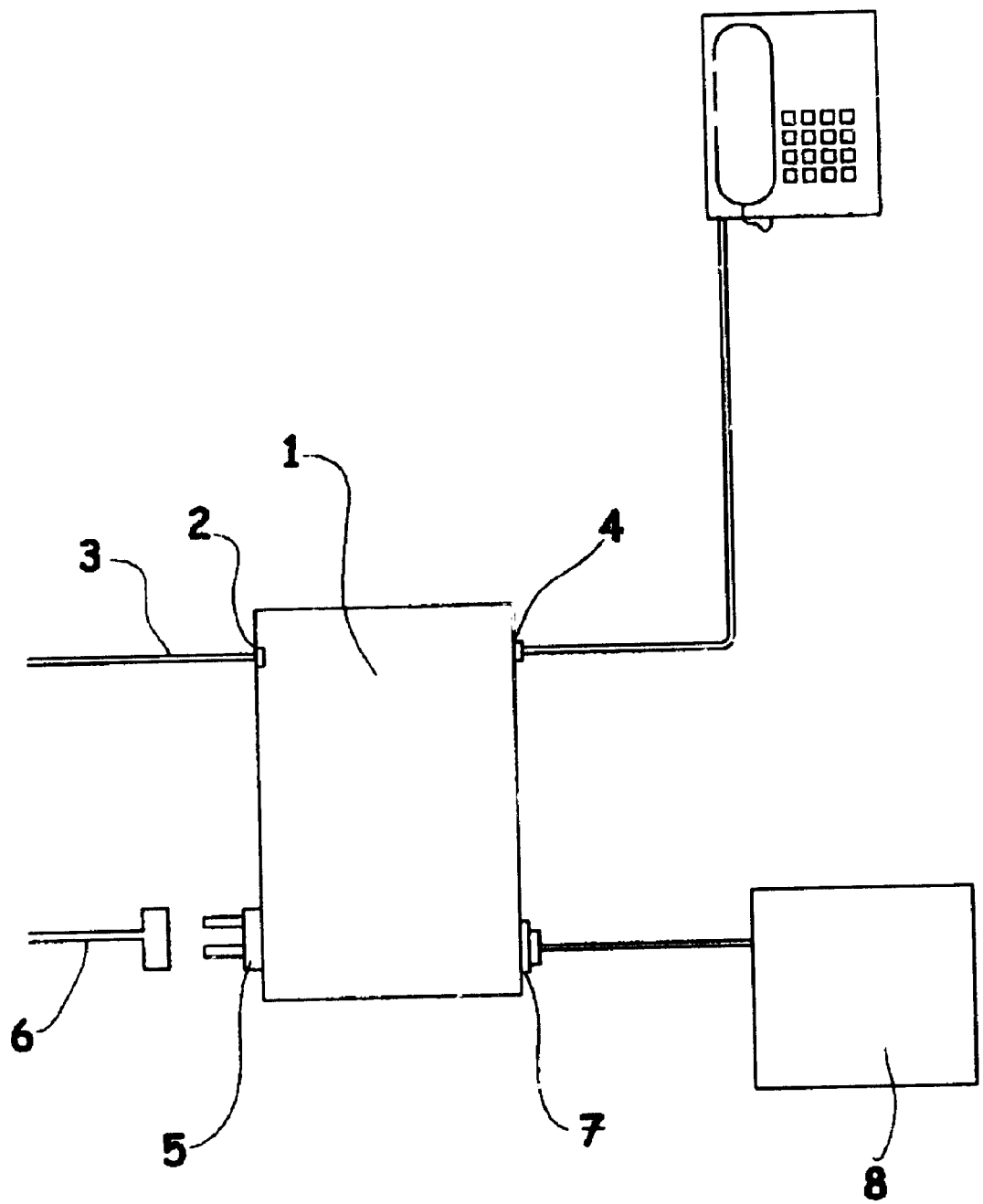
FIG. 1: shows a schematic representation (not to scale) of a unit incorporating a telecommunication control switching device of the present invention.

The unit 1 of FIG. 1 has a socket 2 for receiving a telecommunication line 3 and a separate socket 4 for interconnecting to telecommunication equipment such as a telephone.

The unit 1 also has a plug 5 for connecting the unit 1 to a power supply 6. In addition there is a socket 7 into which may be connected an electrical device 8.

Figure 2:
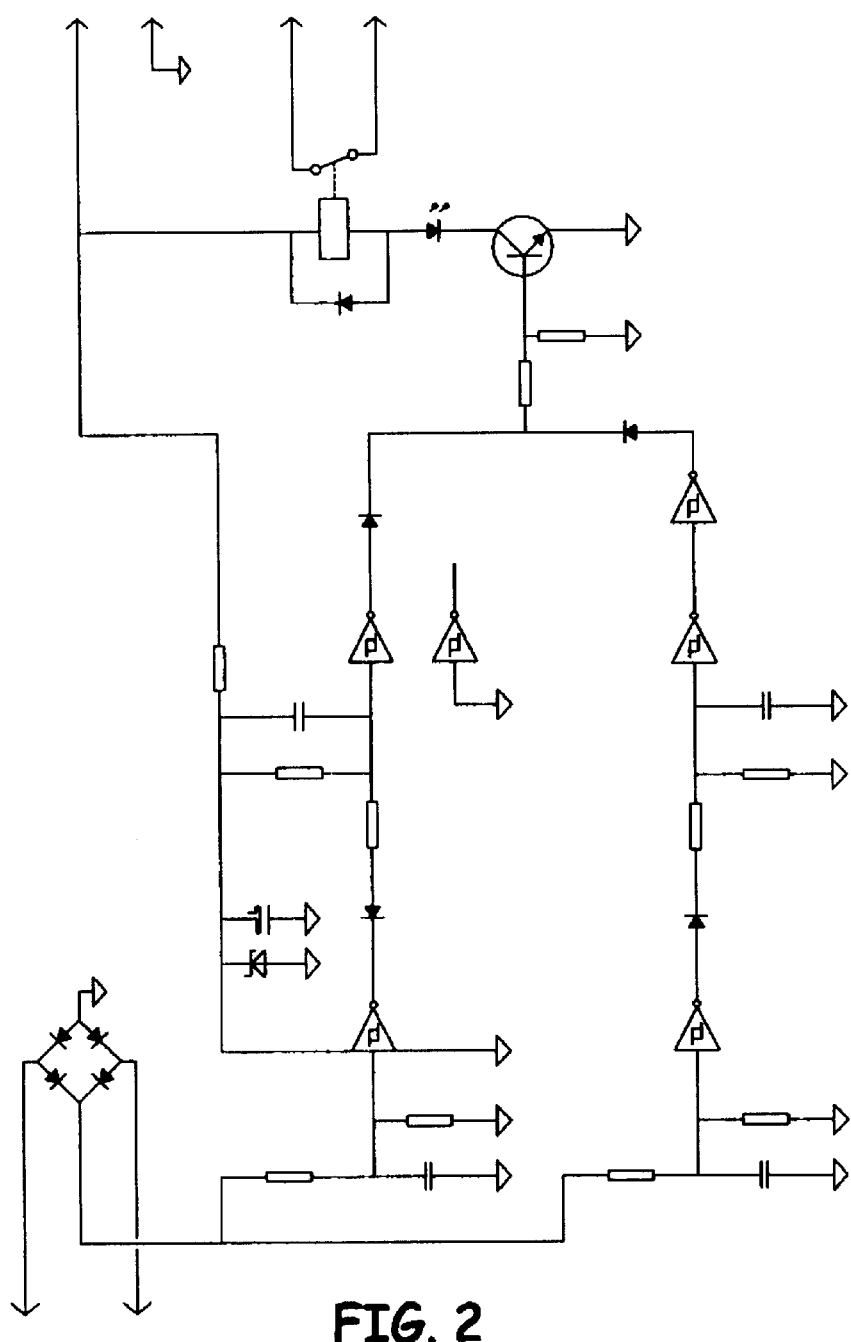
FIG. 2: shows a circuit diagram of a telecommunication control switching device of the present invention in one preferred form.
Figure 3:
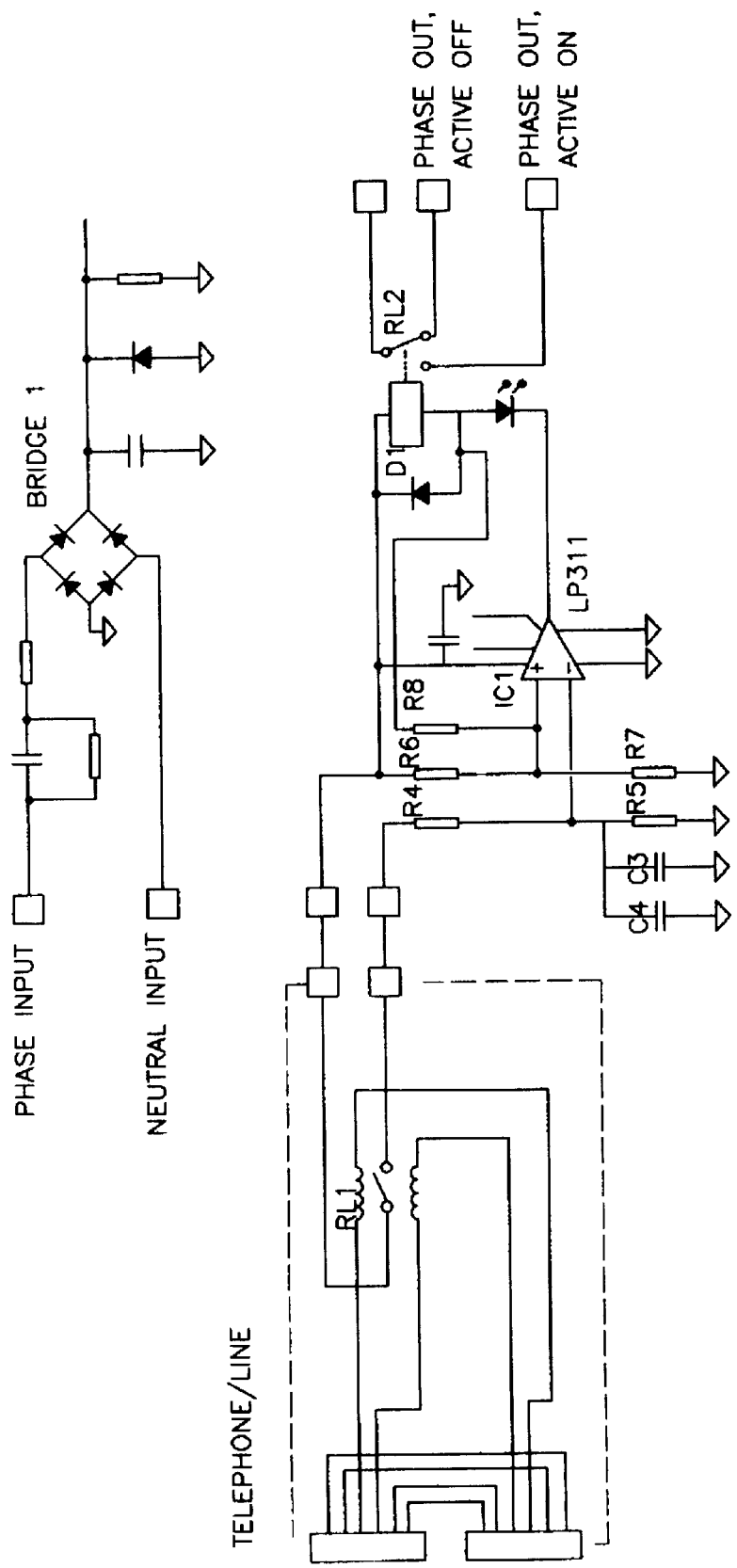
FIG. 3: shows a circuit diagram of a telecommunication control switching device of the present invention in an alternative form.

A telecommunication control switching device of the present invention, preferred embodiments of which are shown in FIGS. 2 and 3, may be housed in such a unit 1.

When connected between a standard analogue telephone line and a telephone set as well as connected To the mains, a device of the present invention will provide a switched mains outlet when either a ring signal or off-hook situation is detected. If either of these conditions are met an internal relay is activated removing temporarily power from a mains outlet socket. Once the telephone line is free again, power is restored to the socket.

Referring to FIG. 2, the circuit includes a bridge rectifier connected to the socket 2 for the telecommunication line 3, two power voltage comparator circuits, each including a comparator and a mono stable vibrator connected to the output of the comparator, and a relay positioned between power input and output means connected to the plug 5 and socket 7, respectively. A relay driver in the form of a transistor may be positioned between the comparator circuits and the relay. In addition, the electronic circuitry may include an adder circuit.

The bridge rectifier supplies positive signals to the comparator circuits. Detection of a "ring" or "off-hook" signal in a telephone is achieved with voltage comparison determined by a voltage divider network, filtered to reduce noise sensitivity.

As soon as a "ring" or "off-hook" signal is detected by the comparators the mono stable circuits are activated to ensure that the internal signals remain active while the ring signal alternates or speech occurs. Each mono stable vibrator is achieved with the use of a diode, a resistor-capacitor combination and a voltage comparator. Activation of the mono stable circuit results in a high level signal which is supplied to the base of the transistor, by means of diodes and current limiting resistors, causing the transistor to conduct and activate the relay and disconnect a power supply to the electrical appliance.

Should the mono stable circuits not be reactivated by either a continuing ringing signal or off-hook detection, they will reset after a period of time and switch the power supply back on.

A telecommunication control switching device of the present invention may rely on an external power supply, or may have a power supply encapsulated within the unit.

FIG. 3 shows an alternative circuit diagram for a telecommunication control switching device of the present invention, including an integrated power supply. The circuit consists of a telephone line current sensing relay (RL1), a voltage comparator/relay driver (IC1), mains relay (RL2) and a circuit providing the internal power.

In this embodiment, the telephone line sensing relay has the advantage that it provides the required isolation between the telephone line and mains as well as low line loss and high noise immunity. This isolation allows the use of a capacitor coupled power supply for the device (as shown in FIG. 3). A further benefit of this alternative embodiment is that in using current sensing instead of voltage sensing, the telephone line can be shared with other telecommunication equipment without disrupting the other connections.

The relay (RL1) senses the telephone line current from 15 to 200 mA activating a contact when off-hook or ring signals (causing the above currents) are being detected. This contact will, therefore, follow the occurring signals through the telephone line and cause burst switching when ringing occurs. Since the mains relay (RL2), used to switch the mains outlet, must remain in a constant position, either on or off, a special mono stable circuit using a voltage comparator (LP311) providing a time delay (R4, C3+C4 and R5) has been implemented.

This circuit will fast charge (through R4) capacitors C3 and C5 when RL1 switches, reach a voltage level (set by R6 and R7), and cause the output of the comparator to be active so that the mains relay (RL2) is switched on. This time constant is chosen such that a number of switching pulses are required (basically by integration) to activate the device while maintaining sufficient noise immunity.

The mains relay will remain on until C3 and C4 are discharged by R7 and the lower switch level of the comparator is reached. This time constant is chosen (approximately 20 seconds) such that long ring intervals up to 10 seconds do not disrupt the operation of the device. This time constant will also cause the mains relay to s witch off approximately 20 seconds after an signal has been detected. Diode D1 is connected in parallel to the mains relay coil and basically protects the output of the comparator (LP311) from damage caused by the back e.m.f. of the coil.

To comply with telecommunication regulations, the circuit providing the internal power may be provided on a separate circuit board fully separated from the main circuit.

A unit 1, housing the telecommunication control switching device of the present invention may include an indicator means, to indicate when the power to the electrical device has been disconnected. Such an indicator means may be a light emitting diode incorporated into the telecommunication control switching device.

Thus, a unit 1 incorporating a telecommunication control switching device of the present invention may be plugged directly into the mains to provide a switched mains outlet when connected between a standard telephone and a telecommunication network. The device will disconnect any appliance from the mains when a telephone "rings" or "off-hook" situation is detected, then will reconnect the appliance to the mains when such signals are no longer detected.

It will be appreciated that the telecommunication control switching device of the present invention may operate either to disconnect or connect power to the electrical device under the predetermined conditions such as a ringing or use of a telephone. Means may therefore be provided to select which operation is required. A unit incorporating a telecommunication control switching device of the present invention may then also include a selection switch to determine whether the electrical device is turned on or off by activation of the device.

It should also be appreciated that whilst the circuitry described is specifically adapted for use with an analogue telephone system, modifications may be made for use of the device with a digital telephone system.

Whilst the invention has been described with particular reference to incorporation of the telecommunication control switching device in a unit adapted to receive a telecommunication line, it will be appreciated that the invention is equally applicable for use with cellular telephones. In that situation the telecommunication line input means is merely replaced with a telecommunication receiving means. Such an embodiment may be particularly useful in cars for controlling a radio, stereo or the like through operation of a cell phone.

Whilst the invention has been described with specific reference to interaction of a telephone with the power supply to an electrical device it will be appreciated that a device of the present invention may be adapted to operate with other telecommunication equipment, such as a facsimile or modem.

Where in the foregoing description reference has been made to specific components and integers of the invention having known equivalents then such equivalents are herein incorporated as if individually set forth.

Although the invention has been described by way of example, and with particular reference to a preferred embodiment thereof, it should be appreciated that variations and modifications may be made thereto, without departing from the scope of the invention, as defined in the following claims.

What is claimed is:

1. A telecommunication control switching device comprising:
    telecommunication receiving means;
    power input means;
    power output means connectable to an electrical appliance;
    power switching means connected between the power input and output means; and
    control means including current sensing means adapted to inductively sense the presence of a signal present in the telecommunication means, the control means adapted to control the power switching means by monitoring the telecommunication receiving means and switching the power switching means to a second state when the control means detects given conditions at the telecommunication receiving means, and reverting said power switching means to a first state when said conditions are no longer present, and wherein the control means monitors the telecommunication receiving means by the current sensing means, the current sensing means adapted to produce a voltage differential at the input to a comparator when a current is sensed, the comparator providing a triggering signal which controls the power switching means.

2. A telecommunication control switching device as claimed in claim 1, wherein the current sensing means is adapted to supply a current for a resistor-capacitor circuit having a pre-determined time constant.

3. A telecommunications control switching device as claimed in claim 2 wherein the comparator means is adapted to monitor the voltage on the resistor-capacitor circuit.

4. A telecommunication control switching device as claimed in claim 3, wherein the resistor-capacitor circuit and comparator means in combination are adapted to provide a delay means.

5. A telecommunication control switching as claimed in claim 3, wherein the resistor-capacitor circuit and comparator means in combination are adapted to provide a mono stable vibrator for the control means.

6. A telecommunication control switching device as claimed in claim 1, wherein the given conditions to be detected by the control means are the ringing and/or in use condition of telecommunication equipment operating on the telecommunication receiving means.

7. A telecommunication control switching device as claimed in claim 1, wherein the power switching means comprises a relay.

8. A telecommunication control switching device according to claim 1, wherein the control means comprises two units, each unit comprising a comparator and a mono-stable vibrator connected to the output of the comparators.

9. A telecommunication control switching device according to claim 1, wherein the power input means is adapted to connect to a conventional power point.

10. A telecommunication control switching device according to claim 1, wherein the telecommunication receiving means comprises a telecommunication input means for a telecommunication line.

11. A telecommunication control switching device according to claim 1, further comprising an indicator means adapted to indicate when the power input means and power output means are disconnected from one another.

12. A telecommunication control switching device according to claim 1 further comprising reverse operation means adapted to control whether the power switching means turns the power on or off under the given conditions.

13. A telecommunication control switching device according to claim 1, further comprising an integrated internal power supply.

14. A telecommunication control switching device according to claim 1, including a capacitor coupled power supply which is voltage isolated from the telecommunication receiving means.

15. A method of controlling the power supply to an electrical device through a telecommunication network, said method comprising:
    monitoring a telecommunication receiving means by inductively sensing current in the telecommunication receiving means;
    detecting predetermined conditions of current in the telecommunication receiving means;
    operating a power switching means to connect or disconnect a power input means from a power output means to which may be connected the electrical device when said predetermined conditions are met and reversing said power switching means to disconnect or connect said power input and output means when said conditions are no longer present, wherein a voltage differential is produced responsive to the current sensing step, the voltage differential being processed to provide a triggering signal which controls the power switching means.

16. A method according to claim 15, wherein the predetermined conditions may comprise ringing and/or use of telecommunication equipment operating on the telecommunication receiving means.

17. A telecommunication control switching device including:
    telecommunication receiving means adapted to interface with a telecommunication means;
    power input means;
    power output means connectable to an electrical appliance;
    power switching means connected between the power input and power output means;

current sensing means adapted to inductively sense given conditions of current in the telecommunication means and to supply a current when set conditions are sensed;

resistor-capacitor circuit connected to the current sensing means;

comparator means adapted to produce a control signal for the switching means according to predetermined voltage conditions on the resistor-capacitor circuit which corresponds to a ringing or an in-use condition on the telecommunication means wherein the resistor-capacitor circuit in combination with the comparator acts to provide a mono-stable vibrator and delay means such that the power switching means disconnects the power input means from the power output means a given delay after said ringing or in-use conditions have occurred.

* * * * *